(12) United States Patent
Lee et al.

(10) Patent No.: US 7,044,888 B2
(45) Date of Patent: May 16, 2006

(54) METHOD OF CONTROLLING ENGAGEMENT OF A STARTING CLUTCH IN AN AUTOMATIC TRANSMISSION DURING VEHICLE LAUNCH

(75) Inventors: Chunhao J. Lee, Troy, MI (US); Kumaraswamy V. Hebbale, Troy, MI (US)

(73) Assignee: General Motors Corporation, Detroit, MI (US)

( * ) Notice: Subject to any disclaimer, the term of this patent is extended or adjusted under 35 U.S.C. 154(b) by 117 days.

(21) Appl. No.: 10/813,900

(22) Filed: Mar. 31, 2004

(65) Prior Publication Data

US 2005/0221958 A1      Oct. 6, 2005

(51) Int. Cl.
*G06F 17/00* (2006.01)
*B60K 41/02* (2006.01)

(52) U.S. Cl. .................... 477/167; 477/176; 477/180; 701/68

(58) Field of Classification Search ............... 477/167, 477/176, 180; 701/67, 68
See application file for complete search history.

(56) References Cited

U.S. PATENT DOCUMENTS

| | | | | |
|---|---|---|---|---|
| 4,957,194 A | * | 9/1990 | Sawa et al. | 477/169 |
| 5,060,770 A | * | 10/1991 | Hirano et al. | 477/39 |
| 5,074,166 A | * | 12/1991 | Yamashita et al. | 477/39 |
| 5,413,539 A | * | 5/1995 | Leonard et al. | 475/63 |
| 6,299,565 B1 | | 10/2001 | Jain et al. | 477/143 |
| 6,364,811 B1 | * | 4/2002 | Hubbard et al. | 477/143 |
| 6,502,474 B1 | * | 1/2003 | Sakamoto et al. | 74/325 |
| 6,890,284 B1 | * | 5/2005 | Sakamoto et al. | 477/109 |

FOREIGN PATENT DOCUMENTS

JP     04203560 A  *  7/1992
JP     04203561 A  *  7/1992

* cited by examiner

*Primary Examiner*—Tisha Lewis
(74) *Attorney, Agent, or Firm*—Kathryn A. Marra

(57) ABSTRACT

A control strategy is provided for controlling engagement of a clutch during vehicle launch. A feed-back input command and a feed-forward input command are utilized and summed to determine a clutch control command. The feed back input command uses a reference slip profile having a low speed portion and a high speed portion. In the low speed portion, the slip is a function of engine speed. In the high speed portion, the slip is a function of transmission output speed or vehicle speed.

15 Claims, 1 Drawing Sheet

METHOD OF CONTROLLING ENGAGEMENT OF A STARTING CLUTCH IN AN AUTOMATIC TRANSMISSION DURING VEHICLE LAUNCH

TECHNICAL FIELD

The invention relates to a control strategy for controlling engagement of a starting clutch in an automatic transmission during vehicle launch wherein feed-forward and feed-back input commands are provided to establish a clutch control command.

BACKGROUND OF THE INVENTION

In a conventional automatic transmission, a torque converter is typically included in the driveline. It is located between the crankshaft of an internal combustion engine and the transmission gearing that establishes torque flow paths to the vehicle wheels. The function of the torque converter is to provide fast and smooth vehicle launch via its torque multiplication and provide driveline torsional damping capabilities. Due to the nature of the fluid coupling in the torque converter, a certain amount of energy is lost in the fluid as the turbine slips with respect to the engine speed, which results in efficiency losses and a corresponding reduction in vehicle fuel economy. A starting clutch may provide a more fuel efficient device for vehicle launch as a replacement for the torque converter.

The fluid coupling of the torque converter is effective at preventing excitation of the vehicle driveline as a result of engine vibrations because the vibrations are dissipated in the torque converter fluid. However, if a starting clutch is used to replace the torque converter, then the starting clutch must be controlled to prevent such excitation of the vehicle driveline and to provide a vehicle launch which is as smooth as that of a torque converter equipped vehicle.

SUMMARY OF THE INVENTION

With the present invention, the torque converter is replaced by a wet clutch, which is either located between the engine and the input shaft of the transmission as an input starting clutch, or located inside the transmission as one of the range clutches applied in the first and/or reverse gears. The invention provides a control strategy in which the starting clutch is slipped during vehicle launch to achieve high torque and minimize vehicle driveline excitation. As the vehicle launches from rest, the algorithm controls the input force on the clutch, such as the pressure of the clutch piston or the current of an electric device, so that the clutch slips from a high rate to a very low rate in a controlled manner.

This control strategy commences when the engine power increases from idle speed as throttle position changes or when the vehicle starts moving in a "creep" condition (i.e., when the vehicle launches without gas pedal demand). The algorithm consists of a feed-forward input, which is a function of an engine operating parameter, such as throttle or gas pedal position or calculated engine torque, and a clutch slip speed feed-back input, which is a function of the clutch slip deviation from a reference input.

More specifically, the invention provides a method of controlling engagement of a starting clutch for a transmission connected to a throttle-controlled engine. The method includes: (a) providing a feed-forward input command as a function of an engine operating parameter, such as position of the throttle or gas pedal, or engine torque; (b) providing a feed-back input command as a function of measured clutch slip determined from transmission input speed and transmission output speed; and (c) summing the feed-forward input command and feed-back input command to determine a clutch control command for controlling application of the starting clutch.

Preferably, the step of providing a feed-back input command includes comparing the measured clutch slip with a reference slip profile. The reference slip profile includes a low speed portion in which slip is a function of engine speed such that slip increases along with engine speed to allow the engine to quickly achieve high torque, and a high speed portion in which slip is a function of vehicle speed (or transmission output speed) such that slip decreases as vehicle speed increases until a final desired relatively low slip is reached. The feed-back input command is provided based upon the comparison with the reference slip profile.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENTS

In general, the present invention uses slip control during launch to control the transfer of torque to the transmission while minimizing vibrations. It uses a feed-forward command in connection with a feed-back command to provide a clutch control command.

Figure 1:
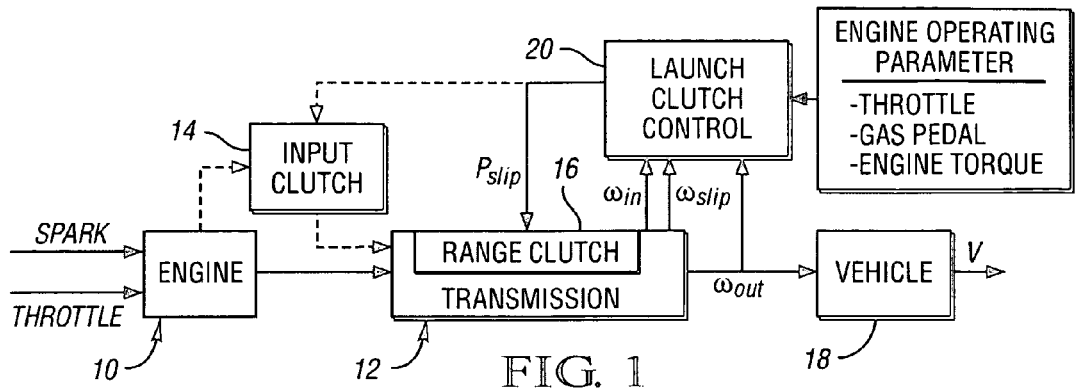
FIG. 1 is a schematic diagram of a control strategy in accordance with the present invention.

FIG. 1 shows a schematic diagram of a control strategy of the present invention. As shown, an engine 10 receives spark and throttle inputs. The engine 10 then transfers torque to the transmission 12. This torque transfer between the engine and transmission may occur through an input clutch 14 or through a range clutch 16 (i.e., a clutch which is active in first and/or reverse speeds). Both options are illustrated schematically in FIG. 1. Accordingly, FIG. 1 actually shows two alternative embodiments of the invention, one implementing the input clutch 14, and the other implementing the range clutch 16 as the starting clutch. The transmission output speed ($\omega_{out}$) causes the vehicle 18 to drive at a speed V.

A launch clutch control module 20 receives as inputs an engine operating parameter, such as throttle or gas pedal position or calculated engine torque, the transmission input speed ($\omega_{in}$), the transmission output speed ($\omega_{out}$), and a slip variable ($\omega_{slip}$). The launch clutch control 20 then generates a clutch control command ($P_{slip}$) for controlling engagement of the starting clutch 14 (or 16). The clutch control command ($P_{slip}$) preferably controls the hydraulic force applied within the starting clutch, but may alternatively control current of an electric clutch-apply device.

In this friction launch implementation, the vehicle launch is accomplished solely using the starting clutch pressure. The objective of this launch strategy is two fold: first, it must quickly bring the engine speed to a target value (a function of an engine operating parameter, such as the apply throttle or gas pedal position or calculated engine torque) so that near maximum engine torque corresponding to that throttle is available to move the vehicle. This means that the starting clutch slip is initially forced to increase for a short period of time. The second objective is: as the vehicle starts to move and the starting clutch slip starts to decrease, the starting clutch pressure is controlled such that the slip continues to decrease in a smooth manner towards a very low slip (such as 25 rpm). This two fold strategy provides a good initial jerk for launch, and a smooth vehicle acceleration profile. The launch strategy uses engine speed control and clutch speed control simultaneously to improve clutch slip control at the beginning of the launch. The clutch slip control mode becomes active when the transmission is in the first or reverse speeds and the throttle is applied (i.e., the engine output torque increases) or when the brake is released. The launch objectives are met by tailoring the clutch reference slip during the launch.

Figure 2:
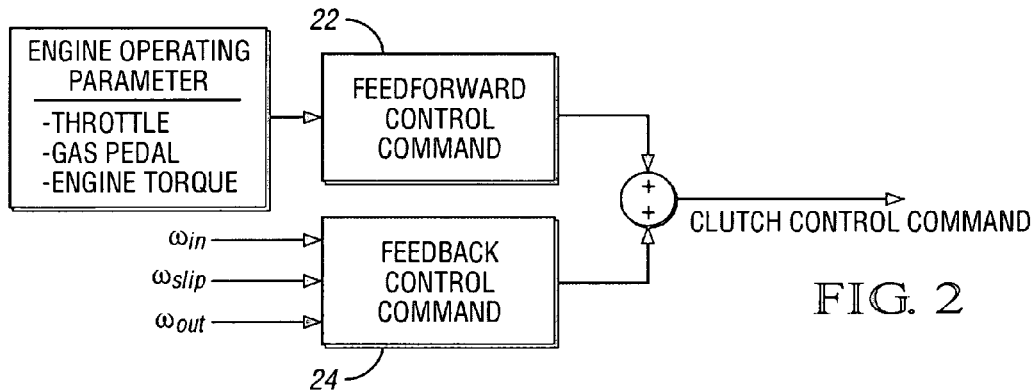
FIG. 2 is a flow diagram illustrating a method of generating a clutch control command corresponding with FIG. 1.

FIG. 2 illustrates the use of the feed-forward control command 22 and feed-back control command 24 in generating the clutch control command. As illustrated, these commands are summed to generate the clutch control command.

The calculation of starting clutch control command ($P_{slip}$) consists of two parts: (1) a feed-forward command; and (2) a feed-back command using proportional-integral-derivative (PID) control. The feed-forward command $P_{slip\_forward}$ is a function of engine throttle or pedal position or calculated engine torque. The feed-forward command for a fixed throttle position at steady state is almost sufficient to carry the full engine torque and lock up the starting clutch. Therefore, the higher the throttle position which increases the engine torque, the higher the clutch feed-forward pressure is required to provide more clutch torque.

The PID slip feed-back control calculates the pressure slip ($P_{slip\_pid}$) by compensating for the error between the reference and actual slips:

$$P_{slip\_pid(n)} = K_{slip\_p} \cdot Err_{slip(n)} + K_{slip\_d} \cdot (Err_{slip\_\Delta(n)}) + K_{slip\_i} \cdot (Err_{slip\_sum(n)})$$

$$Err_{slip(n)} = \omega_{slip(n)} - \omega_{slip\_ref(n)}$$

$$Err_{slip\_\Delta(n)} = Err_{slip(n)} - Err_{slip(n-1)}$$

$$Err_{slip\_sum(n)} = \sum_n Err_{slip(n)}$$

The final clutch pressure $P_{slip}$ is a sum of the two components:

$$P_{slip} = P_{slip\_forward} + P_{slip\_pid}$$

Figure 3:
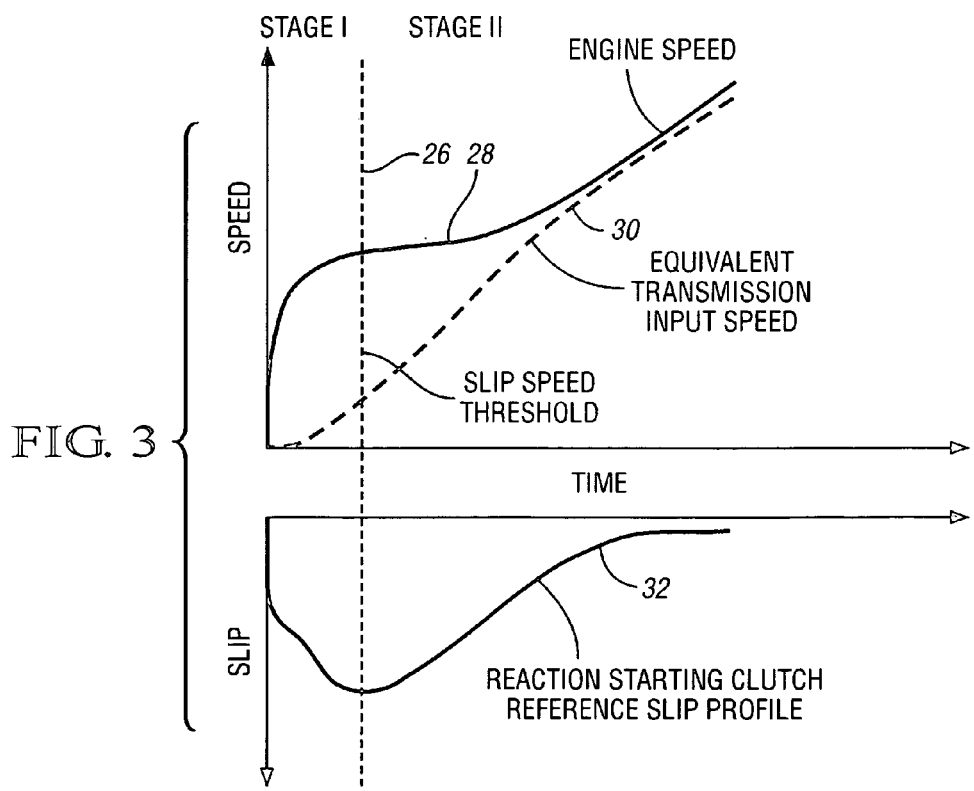
FIG. 3 is a graphical illustration of engine speed, transmission speed, and starting clutch slip vs. time for use in the control strategy of FIGS. 1 and 2.

The reference slip $\omega_{slip\_ref}$ dictates the clutch response to meet the two requirements described above. Therefore, there are two stages in the reference clutch slip, (1) Low Vehicle Speed Profile, and (2) High Vehicle Speed Profile. These speed profiles are shown in FIG. 3, and are separated by the slip speed threshold line 26. The first stage occurs when the vehicle starts to move and the engine speed starts to increase from the idle speed.

Since the engine provides more torque at higher speeds than at the idle speed, the reference slip ($\omega_{slip\_ref}$) in this stage increases as a function of engine speed:

$$\omega_{slip\_ref(n)} = \alpha(\omega_{eng\_n} - \omega_{eng\_n-1}) + \omega_{slip\_ref(n-1)}$$

where $\alpha$ is the calibratable parameter that determines the slope of the allowable slip, $\omega_{eng}$ is the engine speed, $\omega_{slip\_ref}$ is the reference slip, and n and n−1 are the current and previous time steps.

Once the engine speed is higher than a threshold which is a function of the throttle, the second stage is activated and in this stage, the transmission output speed $\omega_{out}$ is increased by commanding lower clutch slip speed $\omega_{slip}$. The reference slip starts to decrease as a function of vehicle speed V until the engine and the equivalent transmission input speeds are nearly synchronized, and is given by the following formula, where $\beta$ is the calibratable parameter:

$$\omega_{slip\_ref(n)} = -\beta(V_n - V_{n-1}) + \omega_{slip\_ref(n-1)}$$

The clutch slip reference remains constant after the synchronization as illustrated in FIG. 3. It should be noted that the equivalent transmission input speed is calculated using the actual transmission output speed and the gear ratio assuming a locked reaction clutch. Therefore, this speed would be equivalent to the transmission input speed in the case of an input starting clutch for the same output speed. The purpose of using the equivalent transmission input speed is to make a clear explanation of the launch slip control concept for the range starting clutch.

Referring again to FIG. 3, line 28 is the engine speed, line 30 is the equivalent transmission input speed, and line 32 is the range starting clutch reference slip profile. The slip trajectory 32 is the desired slip profile for the feed-back controlled PID loop. This slip is the desired difference in rotational speed between the plates of the starting clutch. After reaching a desired operating speed, minimal slip is maintained between the clutch plates to damp out noise and vibration. The profile 32 is the input to the feed back portion of the control.

Accordingly, in accordance with this control strategy, reference slip is prescribed in two stages. Initially, more slip is allowed so that the engine can provide higher torque, and then the slip profile is tightened so that more engine torque will be transmitted to the vehicle. To the left of the slip speed threshold 26 in FIG. 3, the slip is a function of engine speed and therefore increases along with the engine to allow the engine a faster increase to reach the higher torque region (e.g., above about 1,000 rpm). After the threshold 26 is passed, the high vehicle speed profile is active, and is a function of transmission output speed or vehicle speed, and it decreases as vehicle speed increases until the final desired slip speed is reached. Thereafter, the profile maintains a final slip speed level.

This invention enables the use of starting clutch technology which can improve fuel economy, and reduce mass, cost, and packaging issues for automatic transmissions.

While the best mode for carrying out the invention has been described in detail, those familiar with the art to which this invention relates will recognize various alternative designs and embodiments for practicing the invention within the scope of the appended claims.

The invention claimed is:

1. A method of controlling engagement of a starting clutch for a transmission connected to an engine, the method comprising:
providing a feed-forward input command as a function of an engine operating parameter;
providing a feed-back input command as a function of measured clutch slip determined from transmission input speed and transmission output speed; wherein said step of providing a feed-back input command further comprises:

comparing said measured clutch slip with a reference slip profile which includes a low speed stage in which slip is a function of engine speed such that slip increases along with engine speed to allow the engine to quickly achieve high torque, and a high speed stage in which slip is a function of vehicle speed such that slip decreases as vehicle speed increases until a final desired relatively low slip is reached; and providing the feed-back input command based upon said comparison with the reference slip profile; and summing said feed-forward input command and said feed-back input command to determine a clutch control command for controlling engagement of the starting clutch.

2. The method of claim 1, wherein said engine operating parameter is selected from the group consisting of throttle position, gas pedal position, and calculated engine torque.

3. The method of claim 1, wherein said starting clutch is a range clutch positioned inside the transmission and is engaged in a first speed ratio, and the transmission is characterized by the absence of a torque converter.

4. The method of claim 1, wherein said starting clutch is a range clutch positioned inside the transmission and is engaged in a reverse speed ratio, and the transmission is characterized by the absence of a torque converter.

5. The method of claim 1, wherein the starting clutch is an input clutch positioned between the engine and the transmission, and the transmission is characterized by the absence of a torque converter.

6. The method of claim 1, wherein said feed-back input command and said feed-forward input command commence when vehicle speed increases from zero.

7. The method of claim 1, wherein said clutch control command controls the hydraulic force applied within the starting clutch.

8. A method of controlling engagement of a starting clutch for a transmission connected to an engine, the method comprising:

providing a feed-forward input command as a function of an engine operating parameter;

measuring clutch slip;

comparing said measured clutch slip with a reference slip profile to provide a feed-back input command, wherein said reference sun profile includes a low speed stage in which slip is a function of en nine speed such that slip increases along with engine speed during launch to allow the engine to quickly achieve high torque, and a high speed stage in which slip is a function of vehicle speed such that slip decreases as vehicle speed increases until a final desired relatively low slip is reached; and summing said feed-forward input command and said feed-back input command to determine a clutch control command for controlling engagement of the starting clutch.

9. The method of claim 8, wherein said engine operating parameter is selected from the group consisting of throttle position, gas pedal position, and calculated engine torque.

10. The method of claim 8, wherein said starting clutch is a range clutch positioned inside the transmission and is engaged in first and reverse speed ratios, and the transmission is characterized by the absence of a torque converter.

11. The method of claim 8, wherein the starting clutch is an input clutch positioned between the engine and the transmission, and the transmission is characterized by the absence of a torque converter.

12. The method of claim 8, wherein said feed-back input command and said feed-forward input command commence when vehicle speed increases from zero.

13. The method of claim 8, wherein said clutch control command controls the hydraulic force applied within the starting clutch.

14. A method of controlling engagement of a starting clutch for a transmission connected to an engine having a throttle, wherein the transmission is characterized by the absence of a torque converter, the method comprising:

providing a feed-forward input command as a function of position of the throttle;

providing a feed-back input command based upon a measured clutch slip determined from transmission input speed and transmission output speed;

summing said feed-forward input command and said feed-back input command to determine a clutch control command for controlling engagement of the starting clutch;

wherein said step of providing a feed-back input command further comprises:

comparing said measured clutch slip with a reference slip profile which includes a low speed stage in which slip is a function of engine speed such that slip increases along with engine speed to allow the engine to quickly achieve high torque, and a high speed stage in which slip is a function of vehicle speed such that slip decreases as vehicle speed increases until a final desired relatively low slip is reached; and providing the feed-back input command based upon said comparison with the reference slip profile; and wherein the starting clutch is an input clutch positioned between the engine and the transmission.

15. The method of claim 14, wherein said feed-back input command and said feed-forward input command commence when vehicle speed increases from zero.

* * * * *